United States Patent
Abe et al.

(10) Patent No.: US 7,559,395 B2
(45) Date of Patent: Jul. 14, 2009

(54) INTAKE AIR CONTROL DEVICE, AND VEHICLE INCLUDING SAME

(75) Inventors: Takeru Abe, Saitama (JP); Ryutaro Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 457 days.

(21) Appl. No.: 11/581,521

(22) Filed: Oct. 16, 2006

(65) Prior Publication Data

US 2007/0084657 A1    Apr. 19, 2007

(30) Foreign Application Priority Data

Oct. 18, 2005    (JP)    ............................ 2005-303313

(51) Int. Cl.
   *B62K 11/00*    (2006.01)
(52) U.S. Cl. ..................................... 180/219
(58) Field of Classification Search .................. 180/219
   See application file for complete search history.

(56) References Cited

U.S. PATENT DOCUMENTS 5,758,623 A * 6/1998 Nitta et al. .................. 123/470
6,196,186 B1 * 3/2001 Nagasaka et al. ........... 123/336
2003/0217612 A1 * 11/2003 Tanaka ......................... 74/489
2005/0211220 A1 * 9/2005 Matsuda ..................... 123/336
2006/0219455 A1 * 10/2006 Watanabe et al. ........... 180/219

FOREIGN PATENT DOCUMENTS

EP    1541457    6/2005
JP    04-203431    7/1992

* cited by examiner

*Primary Examiner*—Paul N Dickson
*Assistant Examiner*—Michael R Stabley
(74) *Attorney, Agent, or Firm*—Carrier, Blackman & Associates, P.C.; William D. Blackman; Joseph P. Carrier

(57) ABSTRACT

An intake air control device is provided in which a throttle valve is fixed to a valve shaft which is rotatably supported within air intake path of an engine body. An actuator is connected to an end of the valve shaft to reduce the length of a throttle cable while simplifying the structure of a steering handle in the vicinity of the throttle grip. A vehicle body frame includes a head pipe at a front end, and a pair of main frames bifurcated from the head pipe to the left and right and toward the rear. A throttle operating amount detecting module, formed by mounting a throttle operating amount sensor to a storage box for storing a rotating member, which rotates in response to a throttle operation, is supported by one of the main frames in front of an air intake path forming body and arranged between the main frames.

16 Claims, 6 Drawing Sheets

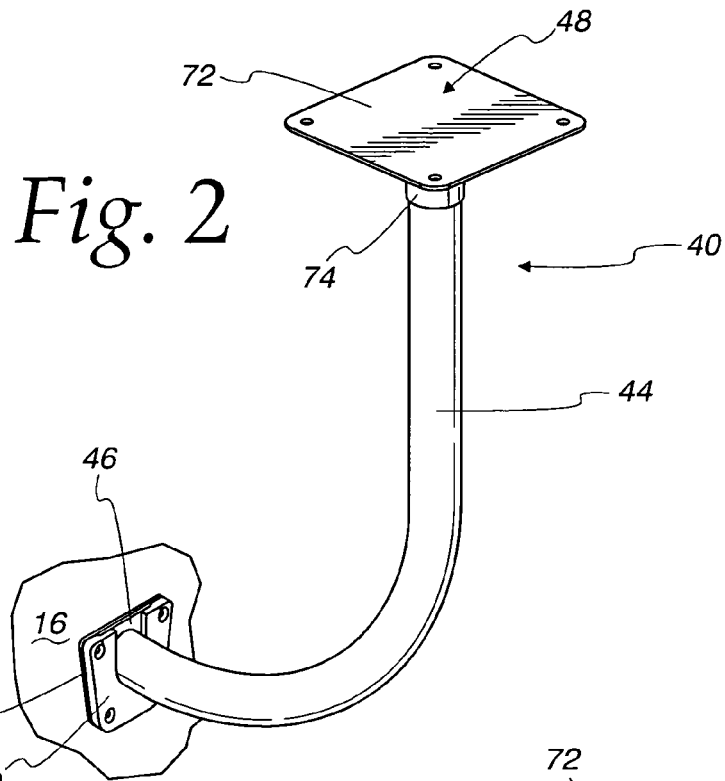
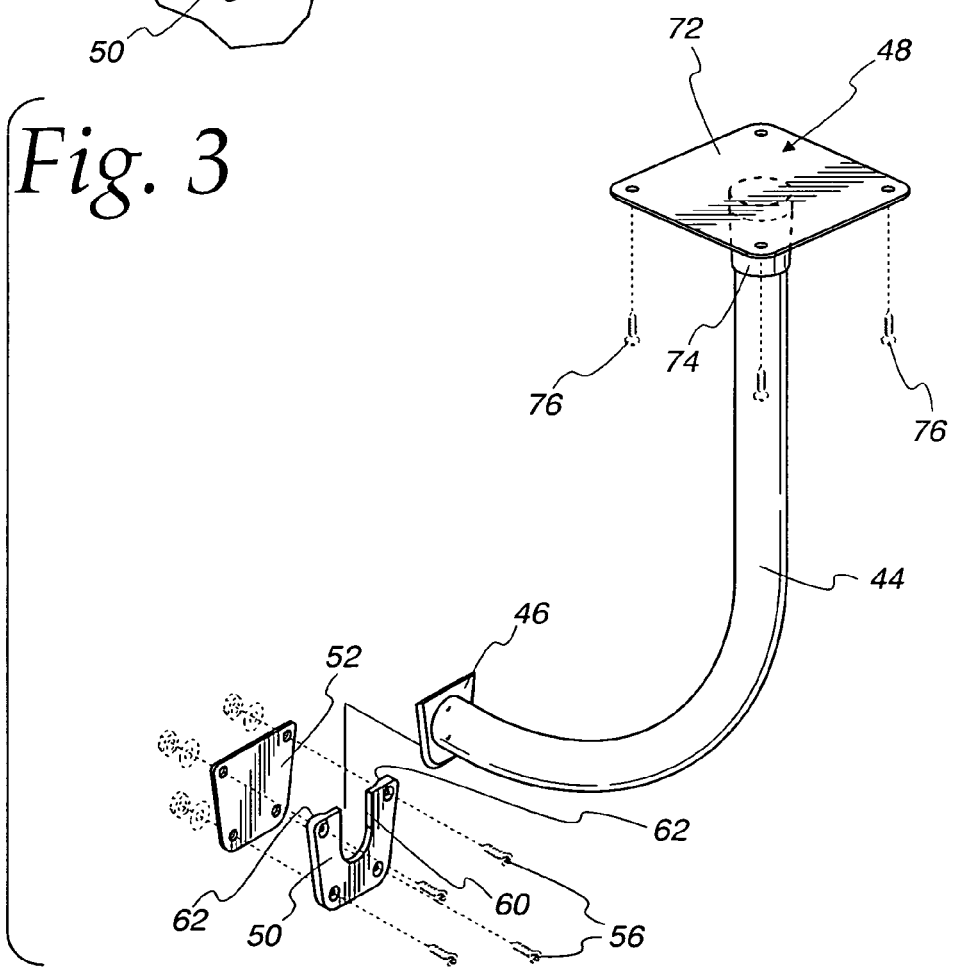

INTAKE AIR CONTROL DEVICE, AND VEHICLE INCLUDING SAME

CROSS-REFERENCE TO RELATED APPLICATIONS

The present invention claims priority under 35 USC 119 based on Japanese patent application No. 2005-303313, filed on Oct. 18, 2005. The subject matter of this priority document is incorporated by reference herein.

BACKGROUND OF THE INVENTION

1. Field of the Invention

The present invention relates to an intake air control device includes a valve shaft which extends across an air intake path of an air intake path forming body. The valve shaft is rotatably supported by the air intake path forming body, which is connected to a cylinder head of an engine body mounted to a vehicle body frame of a saddle type vehicle. A butterfly-shaped throttle valve is fixed to the valve shaft so as to control the opening of the air intake path. An actuator is connected to an end of the valve shaft, and includes an electric motor. The motor is moved according to a detected value of a throttle operating amount sensor for detecting the throttle operating amount by a vehicle operator.

2. Description of the Background Art

In a known intake air control device, an actuator, including an electric motor, is connected to an end of a valve shaft. The valve shaft is rotatably supported by an air intake path forming body for controlling the amount of intake air of an internal combustion engine to be mounted to a vehicle. Such an intake air control device is disclosed, for example, in JP-A-4-203431.

According to the intake air control device disclosed in JP-A-4-203431, a throttle operating amount sensor is provided. The throttle operating amount sensor detects the operating amount of an accelerator pedal, which corresponds to the throttle operating amount input by a vehicle operator. The throttle operating amount sensor is arranged in the vicinity of the accelerator pedal. However, when this technology is applied to a saddle type vehicle, mounting of the throttle operating amount sensor to a steering handle in the vicinity of the throttle grip instead of the accelerator pedal makes the structure in the vicinity of the throttle grip complex, which may cause increase in weight of the steering handle. Although assembly of the throttle operating amount sensor to an air intake path forming body can be considered as an alternative mounting location, if doing so, the length of a throttle cable which is moved in response to the operation of the throttle grip increases, and hence friction of the throttle cable also increases.

In view of such circumstances, it is an object of the present invention to provide an intake air control device in which the length of the throttle cable, which is moved in response to the operation of the throttle grip, can be reduced while simplifying the structure of the steering handle in the vicinity of the throttle grip.

SUMMARY

In order to achieve the object described above, a first aspect of the invention is directed to an intake air control device in which a valve shaft extends across an air intake path of an air intake path forming body, and is rotatably supported by the air intake path forming body. The air intake path forming body is connected to a cylinder head of an engine body, which is mounted to a vehicle body frame of a saddle type vehicle. A butterfly-shaped throttle valve is fixed to the valve shaft so as to control the opening of the air intake path. An actuator includes an electric motor which is moved according to a detected value of a throttle operating amount sensor. The throttle operating amount sensor detects the throttle operating amount by a vehicle operator, and is connected to an end of the valve shaft. The invention is characterized in that the vehicle body frame includes a head pipe at a front end thereof, and a pair of main frames bifurcated to the left and right from the head pipe toward the rear. In addition, a throttle operating amount detecting module is formed by mounting the throttle operating amount sensor, which detects the amount of rotation of a rotating member that is rotated in response to a throttle operation, to a storage box for storing the rotating member. The throttle operating amount detecting module is supported by one of the main frames in front of the air intake path forming body and is arranged between the main frames.

According to the first aspect of the invention, the throttle operating amount detecting module is supported by one of the pair of main frames in front of the air intake path forming body and arranged between the both main frames. Thus, an increase in weight of the steering handle can be avoided while simplifying the structure in the vicinity of the throttle grip by avoiding arrangement of the throttle operating amount sensor in the vicinity of the throttle grip and, in addition, the length of the throttle cable which is moved in response to the operation of the throttle grip can be reduced as much as possible to reduce the friction of the throttle cable while facilitating layout of the throttle cable.

A second aspect of the invention is directed to an intake air control device in which a valve shaft extends across an air intake path of an air intake path forming body, and is rotatably supported by the air intake path forming body. The air intake path forming body is connected to a cylinder head of an engine body, which is mounted to a vehicle body frame of a saddle type vehicle. A butterfly-shaped throttle valve is fixed to the valve shaft so as to control the opening of the air intake path. An actuator, including an electric motor, is connected to an end of the valve shaft and the motor is moved according to a detected value of a throttle operating amount sensor, which detects the throttle operating amount by a vehicle operator. The invention is characterized in that the vehicle body frame includes a head pipe at a front end thereof, and a pair of main frames bifurcated to the left and right from the head pipe toward the rear. In addition, a throttle operating amount detecting module is formed by mounting the throttle operating amount sensor, which detects the amount of rotation of a rotating member, to a storage box for storing the rotating member, the rotating member being rotated in response to a throttle operation. The throttle operating amount detecting module is arranged in the vicinity of the head pipe and supported by the vehicle body frame.

According to the second aspect of the invention, the throttle operating amount detecting module is supported by the vehicle body frame in the vicinity of the head pipe. Thus, increase in weight of the steering handle can be avoided while simplifying the structure in the vicinity of the throttle grip by avoiding arrangement of the throttle operating amount sensor in the vicinity of the throttle grip and, in addition, the length of the throttle cable which is moved in response to the operation of the throttle grip can be reduced as much as possible to reduce the friction of the throttle cable while facilitating layout of the throttle cable.

In addition to the configuration of the invention according to the first or second aspects thereof, a third aspect of the invention is characterized in that a control box, which stores a control unit for controlling the movement of the electric motor according to the detected value of the throttle operating amount sensor, is mounted to the air intake path forming body at a position to sandwich the valve shaft with respect to the actuator. In addition, an intake air pressure sensor and an intake air temperature sensor are disposed in the control box.

According to the third aspect of the invention, since the electric motor and the control unit are arranged on both sides of the air intake path forming body, wiring between the control unit and the electric motor can be minimized as much as possible, and hence a control system for controlling the movement of the electric motor can be arranged compactly in a periphery of the air intake path forming body.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 2 is a plan view of the motorcycle body frame and the engine mounted thereon obtained by viewing in the direction indicated by an arrow 2 in FIG. 1, in a state in which an air cleaner is omitted, showing the intake air control device disposed between the left and right main frames.

FIG. 3 is a front view of the intake air control device viewed from the direction of the arrow 3 in FIG. 2.

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. In the following description of the saddle type vehicle of the illustrative embodiment, the vehicle is exemplified by a motorcycle.

Figure 1:
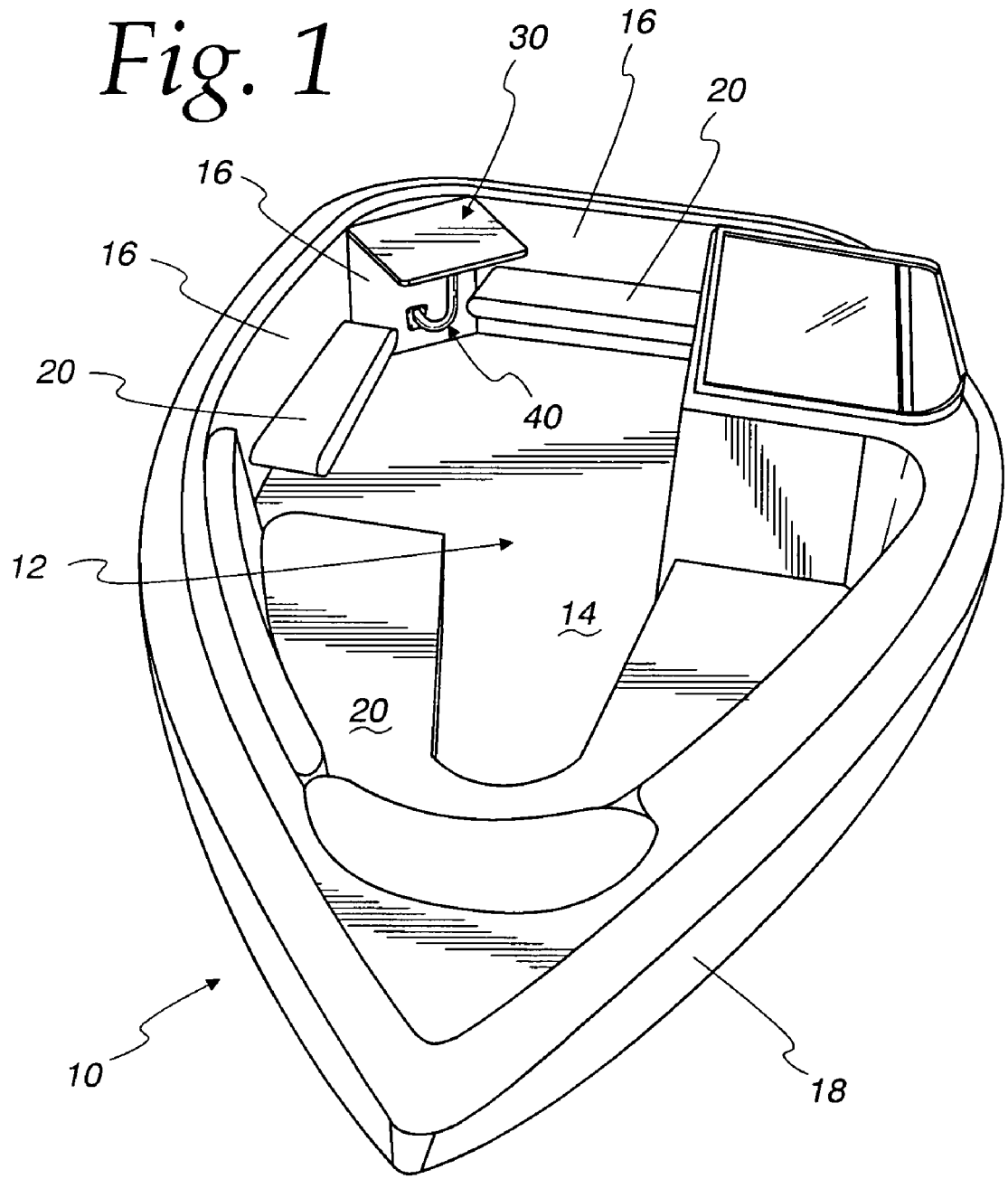
FIG. 1 is an isolated side view of a motorcycle body frame and an engine mounted thereon showing the intake air control device disposed above the engine and below the main frames.

In FIG. 1 and FIG. 2, a vehicle body frame F of the motorcycle includes a head pipe 11 at a front end thereof, and a pair of left and right main frames 12 bifurcated from the head pipe 11 to the left and right and obliquely extending rearward and downward. The vehicle body frame F also includes pivot plates 13 connected to rear portions of the both main frames 12, and down pipes 14 bifurcated to the left and right under the both main frames 12. The down pipes 14 are connected to the head pipe 11 and extend obliquely rearward and downward at an angle steeper than that of the main frames 12.

An engine body 15 is configured to include six horizontally opposed cylinders, including three cylinders arranged on both left and right sides, each set of three cylinders extending in the fore-and-aft direction of the motorcycle. The engine body 15 is mounted to the vehicle body frame F so as to be positioned below the main frames 12, and the engine body 15 is supported by a midsection of the main frames 12, the pivot plates 13 and the down pipes 14.

An air cleaner 16 is mounted to the vehicle body frame F at a position above the engine body 15. An air intake path forming body 18, which forms a pair of air intake paths 17, 17 arranged on the left and right direction of the vehicle body frame F, is arranged between the air cleaner 16 and the engine frame F. An upper portion of the air intake path forming body 18 is connected to a lower portion of the air cleaner 16 so that upstream ends of the both air intake paths 17 communicate with the interior of a purification chamber (not shown) in the air cleaner 16. An intake manifold 22A having three intake pipes 19A, 20A, 21A, which commonly communicate with one of downstream ends of the both air intake paths 17, and an intake manifold 22B having three intake pipes 19B, 20B, 21B, which commonly communicate with the other downstream end of the both air intake paths 17, are connected to a lower portion of the air intake path forming body 18. The respective intake pipes 19A to 21A, 19B to 21B provided by the intake manifolds 22A, 22B are connected to left and right cylinder heads 23 provided by the engine body 15.

Figure 4:
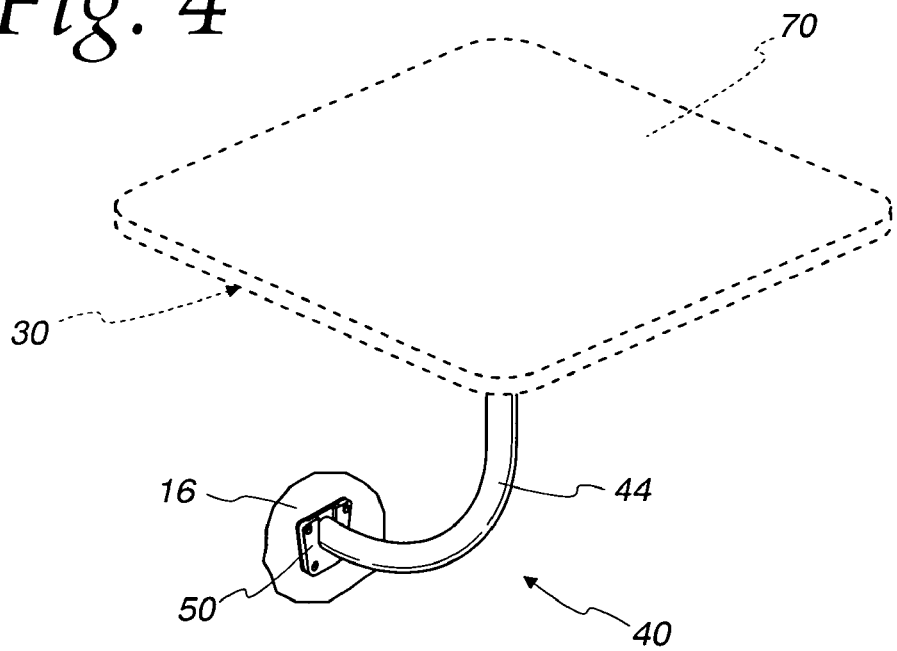
FIG. 4 is a cross-sectional view of the intake air control device taken along the line 4-4 in FIG. 3.

Referring also to FIG. 3 and FIG. 4, a valve shaft 24 extends in the left and right direction of the vehicle body frame F across the both air intake paths 17, 17, and is rotatably supported by the air intake path forming body 18. Butterfly-shaped throttle valves 25, 25 for controlling the opening of the both air intake paths 17 are fixed to the valve shaft 24. In addition, an actuator 26, which rotationally drives the valve shaft 24, is connected to an end of the valve shaft 24, and a control box 27 is mounted to the air intake path forming body 18 so that the valve shaft 24 is sandwiched between the control box 27 and the actuator 26.

Referring specifically to FIG. 4, the actuator 26 includes an electric motor 28 having an axial line of rotation extending in parallel with an axial line of the valve shaft 24. The actuator 26 also includes a decelerating gear mechanism 29 for decelerating the rotational power of the electric motor 28, and transmitting the same to an end of the valve shaft 24. The electric motor 28 is stored and supported in a storage recess 30 provided in the air intake path forming body 18 such that an axis of rotation C2 thereof lies in parallel with the axial line C1 of the valve shaft 24. The air intake path forming body 18 is provided with a cover 33 for covering the actuator 26 mounted thereon. A throttle opening sensor 34 is stored in the cover 33 so that the throttle opening sensor 34, which detects the opening of the throttle valves 25, that is, the rotational position of the valve shaft 24, is connected to an end of the valve shaft 24.

The electric motor 28 is arranged between the main frames 12 in the vehicle body frame F when viewing the motorcycle from above as clearly shown in FIG. 2, and is arranged forwardly of the valve shaft 24 along the fore-and-aft direction of the motorcycle. The engine body 15 is mounted to the vehicle body frame F in an orientation in which a crank axial line CC extends along the fore-and-aft direction of the motorcycle. The axial line C1 of the valve shaft 24 and the axial line of rotation C2 of the electric motor 28 are arranged on an imaginary line SL arranged above the engine body 15, and the line SL is substantially parallel with the crank axial line CC when viewing the motorcycle from the lateral side (FIG. 1).

Figure 5:
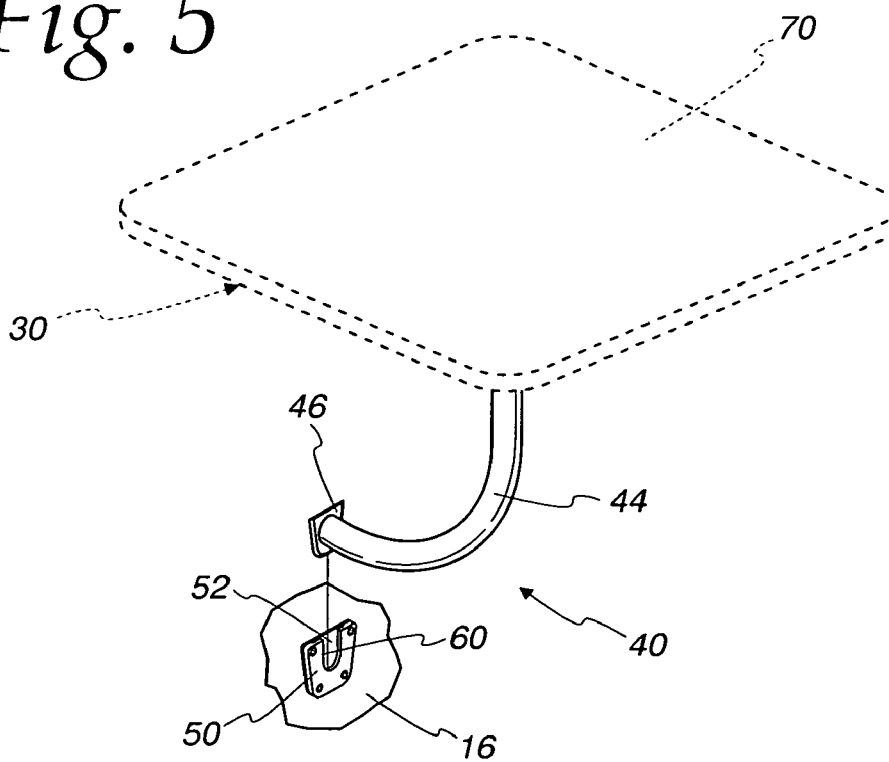
FIG. 5 is a cross-sectional view of the intake air control device taken along the line 5-5 in FIG. 4.

Referring also to FIG. 5, the control box 27 is mounted to the air intake path forming body 18 so as to cover the other end of the valve shaft 24. The control box 27 includes a thick, plate-shaped mounting plate 36 secured to the air intake path forming body 18 with a plurality of screw members 35, and a cup-shaped cover 37 detachably mounted to the mounting plate 36 so as to close an open end of the mounting plate 36. In addition, an intake air pressure sensor 39 that detects the intake air pressure on the upstream side of the throttle valve 25 along an intake air flowing direction 38 in the air intake path 17, and an intake air temperature sensor 40, are mounted to the mounting plate 36. Therefore, a detecting portion 39a at an extremity of the intake air pressure sensor 39 is inserted through an insertion hole 41 provided on the air intake path forming body 18 and arranged so as to be exposed in the air intake path 17. In addition, a path 42 for connecting the air intake path 17 and the intake air temperature sensor 40 is provided through the air intake path forming body 18 and the mounting plate 36. The path 42 is disposed on the downstream side of the throttle valve 25 along the intake air flowing direction 38.

A control unit 43 that controls the movement of the electric motor 28 is stored in the control box 27. The control unit 43 is supported by the mounting plate 36 so as to be covered by the cover 37. In addition, the intake air pressure sensor 39 and the intake air temperature sensor 40 are connected to the control unit 43.

Referring now to FIG. 1 and FIG. 2, a throttle operating amount detecting module 46, to be arranged in front of the air intake path forming body 18, is supported and fixed to a front portion of the vehicle body frame F including the head pipe 11, and the pair of main frames 12, 12 bifurcated from the head pipe 11 to the left and right and extending toward the rear. In this example, as shown by a solid line in FIG. 2, the throttle operating amount detecting module 46 is supported by one of the left and right main frames 12, 12. In this particular example, the throttle operating amount detecting module 46 is supported by the left main frame 12, and arranged between both main frames 12, 12.

However, in an alternative arrangement, the throttle operating amount detecting module may be arranged in the vicinity of the head pipe 11 and supported by the vehicle body frame F as indicated by reference number 46' and shown by a chain line in FIG. 2. In this alternative arrangement, the throttle operating amount detecting module 46' is fixed to the vehicle body frame at a location overlying a centerline of the vehicle, the centerline extending in the fore-and-aft direction of the vehicle.

Figure 6:
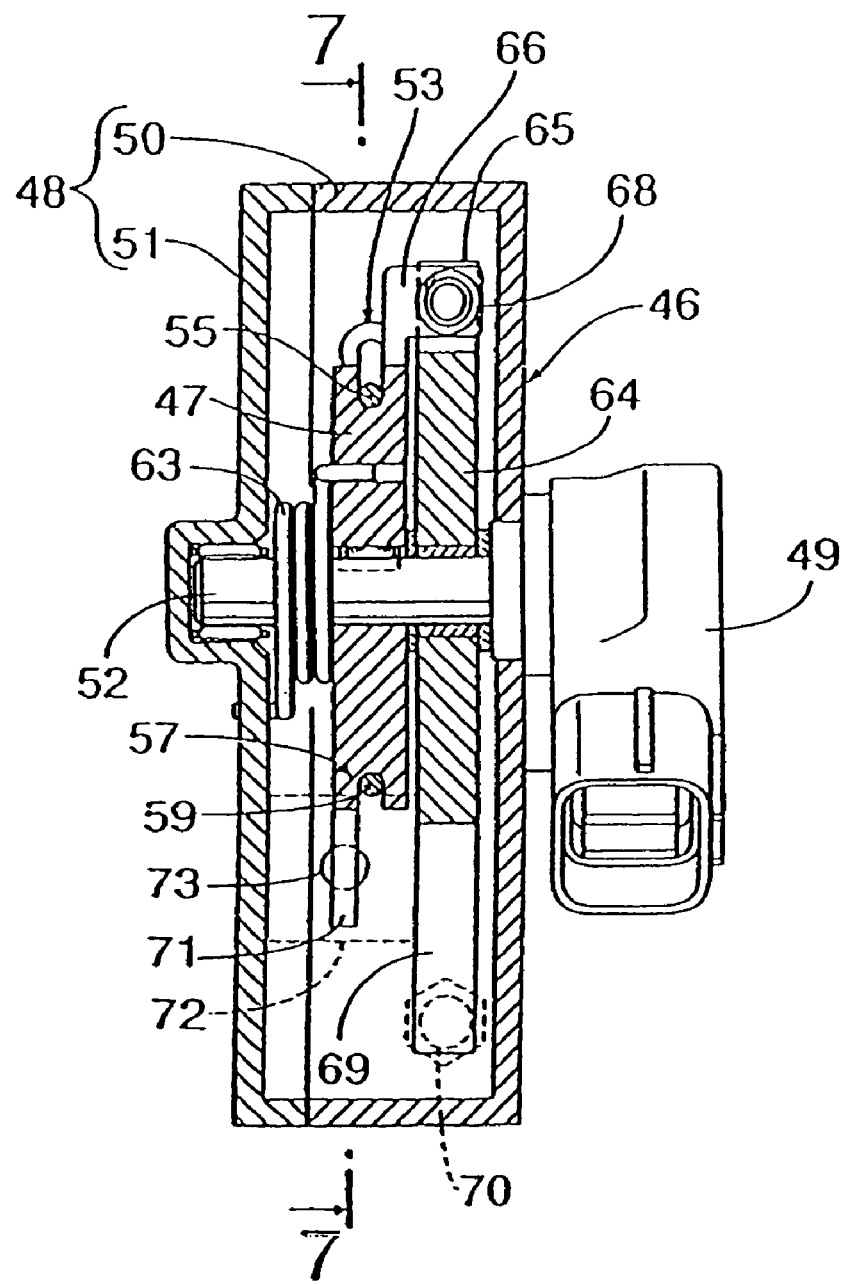
FIG. 6 is a cross-sectional view of the throttle operating amount detecting module taken along the line 6-6 in FIG. 2.
Figure 7:
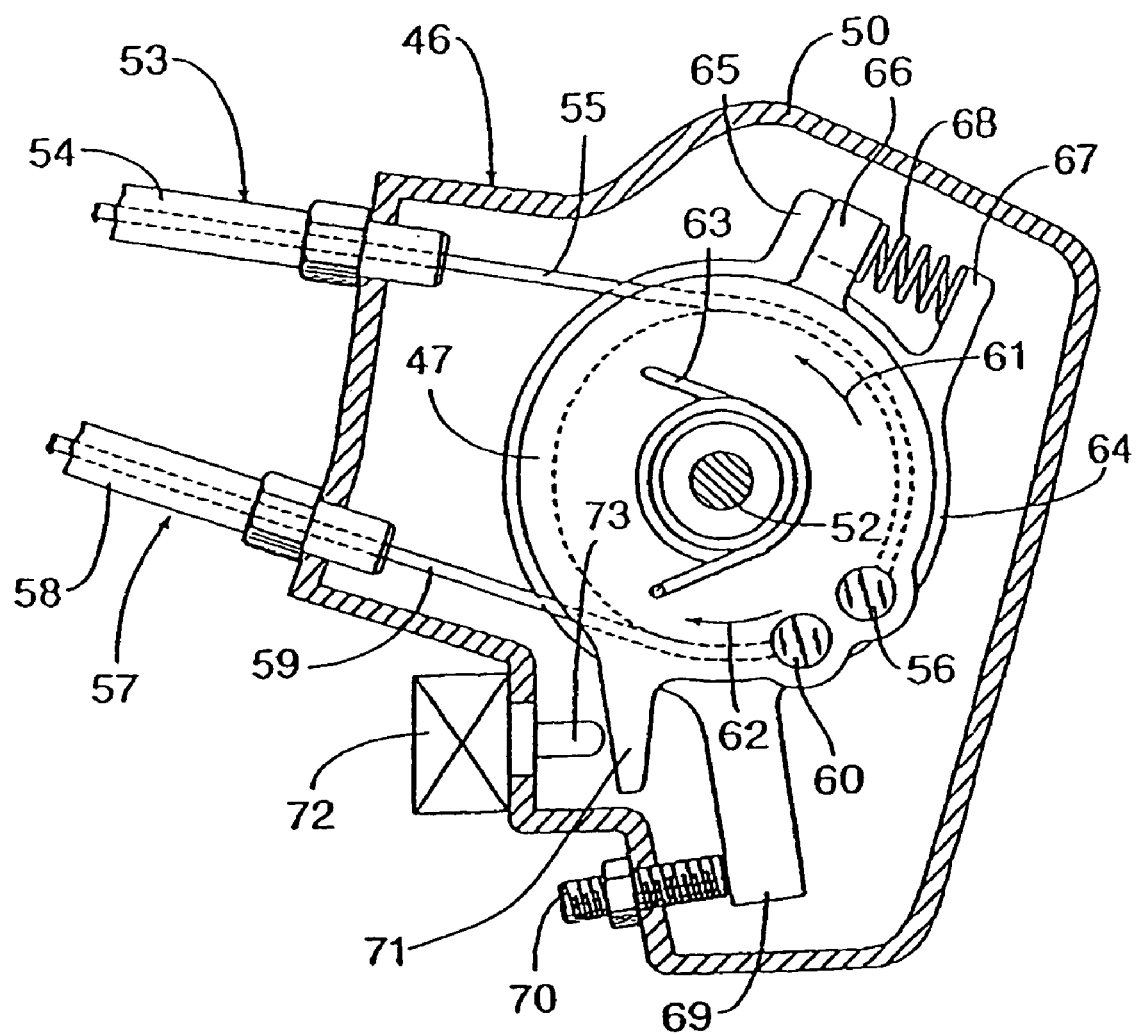
FIG. 7 is a cross-sectional view of the throttle operating amount detecting module taken along the line 7-7 in FIG. 6.

In FIG. 6 and FIG. 7, the throttle operating amount detecting module 46 is formed by mounting a throttle operating amount sensor 49, which detects the amount of rotation of a main throttle drum 47, to a storage box 48. Storage box 48 also stores the main throttle drum 47, which is the rotating member that rotates in response to a throttle operation.

The storage box 48 is fixed to and supported by the main frame 12, and includes a box body 50 and a lid member 51 for closing an opening end of the box body 50. The main throttle drum 47 is mounted so as to be incapable of relative rotation to a revolving shaft 52 rotatably supported at both ends by the box body 50 and the lid member 51, and the throttle operating amount sensor 49, fixed to an exterior surface of the box body 50, is connected to one end portion of the revolving shaft 52.

An opening side throttle cable 53, pulled in response to the rotation of the throttle grip mounted to a steering handle, not shown, to the opening side, and a closing side throttle cable 57, pulled in response to the rotation of the throttle grip to the closing side, are connected to the main throttle drum 47. The opening side throttle cable 53 and the closing side throttle cable 57 are push cables formed by inserting inner cables 55, 59 through outer cables 54, 58 so as to be capable of moving.

The inner cable 55, pulled out from one end of the outer cable 54 of the opening side throttle cable 53, is wound around an outer periphery of the main throttle drum 47 while engaging an engaging piece 56 provided at one end thereof with the main throttle drum 47. The winding direction thereof is set to a direction of rotating the main throttle drum 47 in an opening direction 61 shown by an arrow in FIG. 7 at the time of pulling. The inner cable 59, drawn out from one end of the outer cable 58 of the closing side throttle cable 57, is wound around the outer periphery of the main throttle drum 47 while engaging an engaging piece 60 provided at one end thereof with the main throttle drum 47. The winding direction thereof is set to a direction of rotating the main throttle drum 47 in a closing direction shown by an arrow 62 in FIG. 7 at the time of pulling. The one end portions of the outer cables 54, 58 of the opening side throttle cable 53 and the closing side throttle cable 57 are supported and fixed to the box body 50 of the storage box 48.

A return spring 63 is a torsion spring and is provided between the main throttle drum 47 and the lid member 51 of the storage box 48. The main throttle drum 47 is rotated and urged to the closing direction 62 by the return spring 63.

Therefore, by the opening side throttle cable 53 or the closing side throttle cable 57, when pulled in accordance with the turning operation of the throttle grip, the revolving shaft 52 is rotated with the main throttle drum 47, and hence the amount of rotation of the main throttle drum 47, that is, the throttle operating amount is detected by the throttle operating amount sensor 49.

In addition, a sub throttle drum 64, which is rotatably supported by the revolving shaft 52, is stored so as to be capable of rotating with respect to the main throttle drum 47 in the storage box 48. A receiving projection 65 projects outward from an outer periphery of the sub throttle drum 64, and the main throttle drum 47 includes an abutment projection 66 that comes into abutment with the receiving projection 65 when the main throttle drum 47 rotates in the opening direction 61, whereby the sub throttle drum 64 is rotated in the opening direction. A spring receiving projection 67 projects from the sub throttle drum 64 at a position apart from the receiving projection 65 in the closing direction 62. A lost motion spring 68, that provides a spring load to cause the abutment projection 66 to abut against the receiving projection 65, is provided between the spring receiving projection 67 and the abutment projection 66 in the compressed state, and the spring force of the lost motion spring 68 is set to a value larger than the spring load of the return spring 63.

A limiting projection 69 is projected outward from the outer periphery of the sub throttle drum 64. A limiting screw member 70 is screwed into the box body 50 of the storage box 48 so as to be adjustable in position of advancement. The limiting screw member comes into abutment with the limiting projection 69 at an end of rotation of the sub throttle drum 64 in the closing direction 62. A cancel switch 72 is fixed to the lid member 51 of the storage box 48, and has a detection shaft 73 that protrudes into the storage box 48. The main throttle drum 47 is provided with a detection arm 71 for coming into abutment with the detection shaft 73, and presses the same when the main throttle drum 47 is rotated further to the closing side against a spring force of the lost motion spring 68 when the sub throttle drum 64 is at the end of rotation on the closing side in which the limiting projection 69 is in abutment with the limiting screw member 70.

Figure 8:
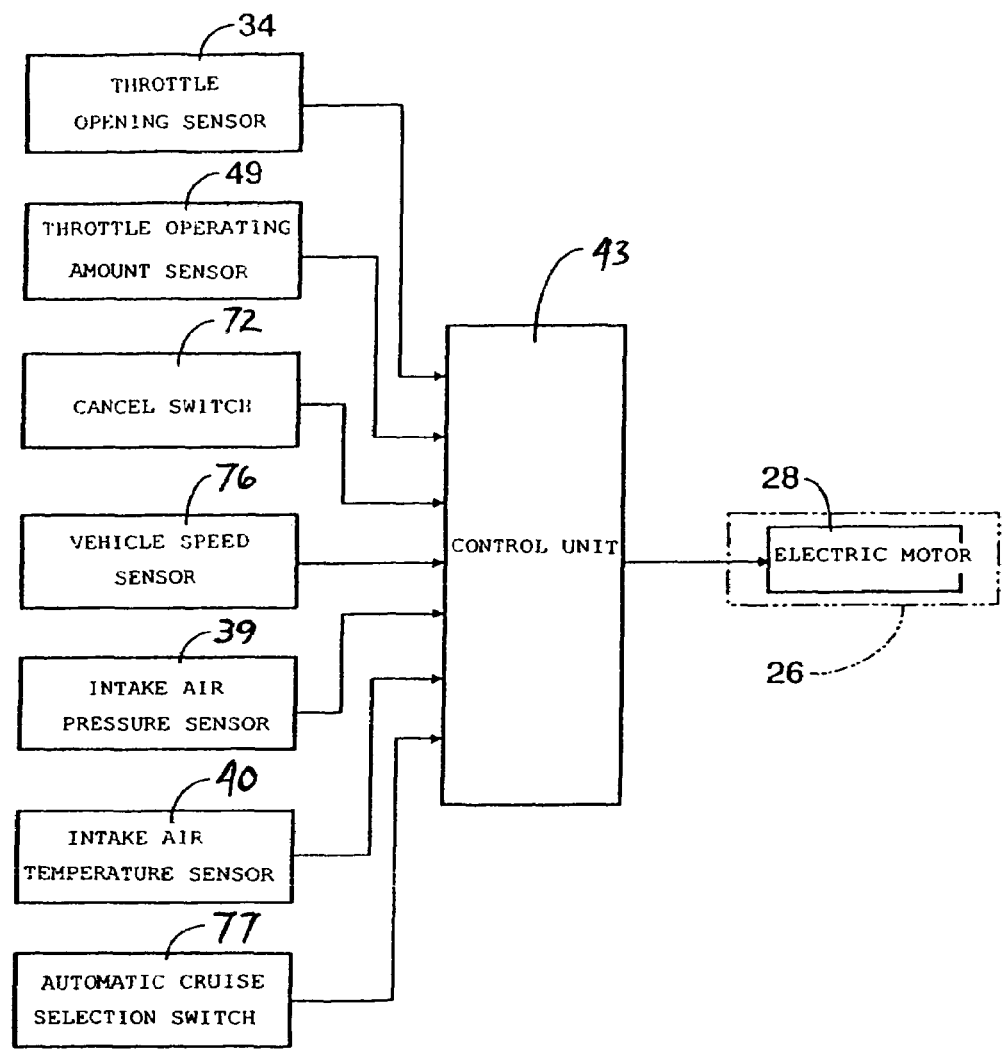
FIG. 8 is a block diagram of a throttle control system which controls the intake air control device of FIG. 1.

As shown in FIG. 8, the movement of the electric motor 28 in the actuator 26 is controlled by the control unit 43, and signals from the throttle opening sensor 34, the throttle operating amount sensor 49, the cancel switch 72, a vehicle speed sensor 76, the intake air pressure sensor 39, the intake air temperature sensor 40, and an automatic cruise selection switch 77 for switching the motorcycle between an automatic cruising state and a non automatic cruising state are supplied to the control unit 43.

In this manner, when the automatic cruise selection switch 77 selects the non automatic cruising state, in response to the supply of the amount of rotation of the main throttle drum 47 when a rider of the motorcycle rotates the throttle grip from the throttle operating amount sensor 49, the control unit 43 controls the operation of the electric motor 28 so as to achieve the throttle opening in response to the throttle operating amount.

When the automatic cruise selection switch 77 selects the automatic cruising state, control unit 43 controls the movement of the electric motor 28 so as to control the throttle opening while considering the intake air pressure and the intake air temperature so as to maintain the vehicle speed obtained by the vehicle speed sensor 76 when the automatic cruise selection switch 77 is switched.

In such an automatic cruising state, when the rider releases the input operation to the throttle grip, the main throttle drum 47 is rotated in the closing direction 62 by a spring force of the return spring 63, and the sub throttle drum 64 also rotates in the closing side by being pressed by the main throttle drum 47 via the lost motion spring 68. Therefore, when the rider performs a throttle operation toward the closing side against the spring force of the lost motion spring 68 when the sub throttle drum 64 is at an end of rotation on the closing side in which the sub throttle drum 64 brings the limiting projection 69 into abutment with the limiting spring member 70, the detection shaft 73 of the cancel switch 72 is pressed by the detection arm 71 of the main throttle drum 47. Therefore, the switching mode of the cancel switch 72 is changed, and the control unit 43 releases the automatic cruising state according to the change of the switching mode.

The operation of this example will be described now. The vehicle body frame F includes the head pipe 11 at the front end thereof, and the pair of main frames 12 which are bifurcated from the head pipe 11 to the left and right and extend obliquely rearward and downward. The actuator 26 includes the electric motor 28 which can provide the power to rotate the valve shaft 24, and is connected to the end of the valve shaft 24. The valve shaft 24 extends in the left and right direction of the vehicle body frame F and is rotatably supported by the air intake path forming body 18. The electric motor 28, having the axial line of rotation C2 which extends in parallel with the axial line C1 of the valve shaft 24, is arranged between the main frames 12 as seen when the motorcycle is viewed from above. Therefore, the electric motor 28, which constitutes a part of the actuator 26, is protected since it is surrounded by the pair of left and right main frames 12.

With the electric motor 28 arranged forwardly of the valve shaft 24 along the fore-and-aft direction of the motorcycle, the electric motor 28 is effectively cooled by wind generated during travel of the motorcycle, and generation of a performance deterioration phenomenon resulted from heat is prevented so that the operability of the electric motor 28 is increased.

In addition, the engine body 15, which includes a horizontally-opposed cylinder configuration, is mounted to the vehicle body frame F in an orientation in which the crank axial line CC extends along the fore-and-aft direction of the motorcycle. In addition, the axial line C1 of the valve shaft 24 and the axial line of rotation C2 of the electric motor 28 are arranged on the imaginary line SL arranged above the engine body 15, the line SL substantially in parallel to the crank axial line CC when the motorcycle is viewed from the lateral side. Therefore, the intake air control device is arranged in the vicinity of an upper surface of the engine body 15, and hence an air intake system can be reduced in size.

The throttle operating amount detecting module 46 is formed by mounting the throttle operating amount sensor 49, which detects the amount of rotation of the main throttle drum 47, to the storage box 48. The storage box 48 stores the main throttle drum 47, which rotates in response to the throttle operation, and is supported by one of the main frames 12 of the vehicle body frame F in front of the air intake path forming body 18 and arranged between the main frames 12. Thus, an increase in weight of the steering handle can be avoided while simplifying the structure in the vicinity of the throttle grip by avoiding arrangement of the throttle operating amount sensor 49 in the vicinity of the throttle grip. In addition, the length of the throttle cables 53, 57, which are moved in response to the operation of the throttle grip, can be reduced as much as possible to reduce the friction of the throttle cables 53, 57 while facilitating layout of the throttle cables 53, 57.

Such advantages can also be obtained when the throttle operating amount detecting module 46 is arranged in an alternative location in the vicinity of the head pipe 11 and supported by the vehicle body frame F.

Furthermore, since the control box 27 is mounted to the air intake path forming body 18 in a configuration in which the valve shaft 24 is sandwiched between the control box 27 and the actuator 26, and since the intake air pressure sensor 39 and the intake air temperature sensor 40 are disposed in the control box 27, wiring between the control unit 43, which is disposed within the control box 27, and the electric motor 28 can be minimized as much as possible, and hence a control system for controlling the movement of the electric motor 28 can be arranged compactly in a periphery of the air intake path forming body 18.

Although the example of the present invention has been described thus far, the present invention is not limited to the embodiment described above, and various modifications in design can be performed without departing from the invention stated in Claims.

For example, the present invention can be implemented widely not only in motorcycles, but also in other saddle-type vehicles.

What is claimed is:

1. An intake air control device for controlling air intake of an engine mounted to a vehicle body frame of a saddle-type vehicle, the engine comprising a cylinder head and an air intake path forming body connected to the cylinder head, the intake air control device comprising:

a valve shaft extending in the left and right direction of the vehicle body frame across an air intake path formed in the air intake path forming body, the valve shaft rotatably supported by the air intake path forming body;

a butterfly-shaped throttle valve fixed to the valve shaft so as to control the opening of the air intake path;

a throttle operating amount sensor which detects a throttle operating amount by a vehicle operator by detecting the amount of rotation of a rotating member that is rotated in response to a throttle operation;

an actuator connected to an end of the valve shaft, the actuator comprising an electric motor which is moved according to a detected value of the throttle operating amount sensor; and a throttle operating amount detecting module comprising the throttle operating amount sensor mounted to a storage box, the storage box configured to store the rotating member, the vehicle body frame comprising:
   a head pipe at a front end thereof; and
   a pair of main frames bifurcated to the left and right from the head pipe toward the rear,
   wherein the throttle operating amount detecting module is supported by one of the main frames,
      disposed in front of the air intake path forming body relative to the forward driving direction of the vehicle, and
      arranged between the main frames as seen when the vehicle is viewed from above.

2. The intake air control device according to claim 1, wherein the intake air control device further comprises:
   a control unit which controls the movement of the electric motor according to the detected value of the throttle operating amount sensor is mounted to the air intake path forming body; and
   a control box for storing the control unit,
   wherein
      the control box is mounted to the air intake path forming body at a position in which the valve shaft is sandwiched between the control box and the actuator, and
      an intake air pressure sensor and an intake air temperature sensor are disposed in the control box.

3. An intake air control device for controlling air intake of an engine mounted to a vehicle body frame of a saddle-type vehicle, the engine comprising a cylinder head and an air intake path forming body connected to the cylinder head,
   the intake air control device comprising:
      a valve shaft extending in the left and right direction of the vehicle body frame across an air intake path formed in the air intake path forming body, the valve shaft rotatably supported by the air intake path forming body;
      a butterfly-shaped throttle valve fixed to the valve shaft so as to control the opening of the air intake path;
      a throttle operating amount sensor which detects a throttle operating amount by a vehicle operator by detecting the amount of rotation of a rotating member that is rotated in response to a throttle operation;
      an actuator connected to an end of the valve shaft, the actuator comprising an electric motor which is moved according to a detected value of the throttle operating amount sensor; and
      a throttle operating amount detecting module comprising the throttle operating amount sensor mounted to a storage box, the storage box configured to store the rotating member,
   the vehicle body frame comprising:
      a head pipe at a front end thereof; and
      a pair of main frames bifurcated to the left and right from the head pipe toward the rear,
      wherein the throttle operating amount detecting module is arranged in the vicinity of the head pipe, and supported by the vehicle body frame.

4. The intake air control device according to claim 3, wherein the intake air control device further comprises:
   a control unit which controls the movement of the electric motor according to the detected value of the throttle operating amount sensor is mounted to the air intake path forming body; and
   a control box for storing the control unit,
wherein
   the control box is mounted to the air intake path forming body at a position in which the valve shaft is sandwiched between the control box and the actuator, and
   an intake air pressure sensor and an intake air temperature sensor are disposed in the control box.

5. The intake air control device according to claim 4, wherein the control box further comprises a mounting plate and a cover, and
   wherein the mounting plate is fixed to the air intake path forming body, the cover encloses an end surface of the mounting plate, and the control unit is disposed on the end surface of the mounting plate so as to be enclosed by the cover.

6. The intake air control device according to claim 5, wherein
   the control box further comprises at least one pathway extending through the mounting plate and air intake path forming body and opening into the air intake path, and
   wherein a sensor is disposed within each at least one pathway such that conditions within the air intake path are detected by the sensor, the sensor communicating with the control unit.

7. The intake air control device according to claim 3, wherein the throttle operating amount detecting module is fixed to the vehicle body frame at a location overlying a centerline of the vehicle, the centerline extending in the fore-and-aft direction of the vehicle.

8. The intake air control device according to claim 3, wherein the throttle operating amount detecting module is fixed to the vehicle body frame at a location that is to one side of a centerline of the vehicle, the centerline extending in the fore-and-aft direction of the vehicle.

9. The intake air control device according to claim 3, wherein the throttle operating amount detecting module comprises a storage box, a main throttle drum, and a throttle operation amount sensor,
   the storage box enclosing the main throttle drum,
   the main throttle drum rotatably supported by the storage box, the main throttle drum configured to rotate in response to an operation of a throttle grip by a vehicle operator,
   the throttle operation amount sensor mounted on the storage box, the throttle operation amount sensor detecting the amount of rotation of the main throttle drum.

10. The intake air control device according to claim 9, wherein the throttle operating amount detecting module further comprises a shaft,
   wherein the shaft is rotatably supported at opposed ends thereof by the storage box, the main throttle drum is mounted on the shaft so as to be incapable of rotation relative to the shaft, and the throttle operation amount sensor is connected to one end of the shaft.

11. The intake air control device according to claim 9, wherein the throttle operating amount detecting module further comprises a shaft,
   wherein the shaft is rotatably supported at opposed ends thereof by the storage box, the main throttle drum is mounted on the shaft so as to be incapable of rotation relative to the shaft, and the throttle operation amount sensor is fixed to an exterior surface of the storage box and is connected to one end of the shaft.

12. A saddle type vehicle employing an intake air control device, the vehicle comprising a vehicle body frame, an engine, and an intake air control device,
   the vehicle body frame comprising:
      a head pipe at a front end thereof; and a pair of main frames bifurcated to the left and right from the head pipe toward the rear, the engine mounted to the vehicle body frame, the engine comprising a cylinder head and an air intake path forming body connected to the cylinder head, and the intake air control device, which controls the air intake of the engine, comprising:

a valve shaft extending in the left and right direction of the vehicle body frame across an air intake path formed in the air intake path forming body, the valve shaft rotatably supported by the air intake path forming body;, a butterfly-shaped throttle valve fixed to the valve shaft so as to control the opening of the air intake path;

a throttle operating amount sensor which detects a throttle operating amount by a vehicle operator by detecting the amount of rotation of a rotating member that is rotated in response to a throttle operation;

an actuator connected to an end of the valve shaft, the actuator comprising an electric motor which is moved according to a detected value of the throttle operating amount sensor; and a throttle operating amount detecting module comprising the throttle operating amount sensor mounted to a storage box, the storage box configured to store the rotating member, wherein the throttle operating amount detecting module is arranged in the vicinity of the head pipe, and supported by the vehicle body frame.

13. The vehicle according to claim 12, wherein the intake air control device further comprises:

a control unit which controls the movement of the electric motor according to the detected value of the throttle operating amount sensor is mounted to the air intake path forming body; and a control box for storing the control unit, wherein the control box is mounted to the air intake path forming body at a position in which the valve shaft is sandwiched between the control box and the actuator, and an intake air pressure sensor and an intake air temperature sensor are disposed in the control box.

14. The vehicle according to claim 12, wherein the throttle operating amount detecting module is fixed to the vehicle body frame at a location overlying a centerline of the vehicle, the centerline extending in the fore-and-aft direction of the vehicle.

15. The vehicle according to claim 12, wherein the throttle operating amount detecting module is fixed to the vehicle body frame at a location that is to one side of a centerline of the vehicle, the centerline extending in the fore-and-aft direction of the vehicle.

16. The vehicle according to claim 12, wherein the throttle operating amount detecting module comprises a storage box, a main throttle drum, and a throttle operation amount sensor, and wherein the storage box encloses the main throttle drum, the main throttle drum is rotatably supported by the storage box, and the main throttle drum is configured to rotate in response to an operation of a throttle grip by a vehicle operator, and the throttle operation amount sensor is mounted on the storage box, the throttle operation amount sensor detecting the amount of rotation of the main throttle drum.

* * * * *